US007978667B2

(12) United States Patent
Kalhan

(10) Patent No.: US 7,978,667 B2
(45) Date of Patent: Jul. 12, 2011

(54) MANAGEMENT OF WLAN AND WWAN COMMUNICATION SERVICES TO A MULTI-MODE WIRELESS COMMUNICATION DEVICE

(75) Inventor: Amit Kalhan, La Jolla, CA (US)

(73) Assignee: Kyocera Corporation, Kyoto (JP)

( * ) Notice: Subject to any disclaimer, the term of this patent is extended or adjusted under 35 U.S.C. 154(b) by 806 days.

(21) Appl. No.: 11/565,419

(22) Filed: Nov. 30, 2006

(65) Prior Publication Data

US 2008/0130598 A1     Jun. 5, 2008

(51) Int. Cl.
*H04W 4/00*     (2009.01)
*H04W 36/00*     (2009.01)
(52) U.S. Cl. .................. 370/338; 455/436; 455/439
(58) Field of Classification Search ............... 370/338
See application file for complete search history.

(56) References Cited

U.S. PATENT DOCUMENTS

| | | | |
|---|---|---|---|
| 4,737,978 A | 4/1988 | Burke et al. |
| 5,208,756 A | 5/1993 | Song |
| 5,293,645 A | 3/1994 | Sood |
| 6,011,974 A | 1/2000 | Cedervall et al. |
| 6,434,367 B1 | 8/2002 | Kumar et al. |
| 6,965,585 B2 | 11/2005 | Grilli et al. |
| 6,990,324 B2 | 1/2006 | Laroia et al. |
| 7,050,819 B2 | 5/2006 | Schwengler et al. |
| 7,167,712 B2 | 1/2007 | Ogino et al. |
| 7,286,834 B2 | 10/2007 | Walter |
| 7,433,673 B1 | 10/2008 | Everson et al. |
| 7,610,049 B2 | 10/2009 | Watanabe |
| 2003/0118015 A1 | 6/2003 | Gunnarsson et al. |
| 2004/0051664 A1 | 3/2004 | Frank |
| 2004/0090937 A1 | 5/2004 | Chaskar et al. |
| 2004/0116133 A1 | 6/2004 | Kalhan et al. |
| 2004/0198220 A1* | 10/2004 | Whelan et al. ............... 455/41.1 |
| 2005/0059400 A1 | 3/2005 | Jagadeesan et al. |

(Continued)

FOREIGN PATENT DOCUMENTS

EP     0504122     9/1992

(Continued)

OTHER PUBLICATIONS

Han, et al. "A Method to Support Femto-Macro Handover with Minimal Interference to the Macro Network" IP.com Journal Oct. 16, 2008, pp. 1-4, West Henrietta, NY US.

(Continued)

*Primary Examiner* — Lester Kincaid
*Assistant Examiner* — Yu (Andy) Gu

(57) ABSTRACT

A mesh network communication system includes a plurality of access points connected to a wireless local area network (WLAN) controller where at least one of the plurality access points is a detection access point (DAP) that receives reverse link (RL) wireless wide area network (WWAN) signals transmitted from a multi-mode wireless communication device. Based on an intercepted RL WWAN signal, the DAP forwards reverse link (RL) information to the WLAN controller. Based on the RL information, the WLAN controller generates and sends, to the WWAN communication system, a device to access point association list (device-AP association list) comprising one or more device identifiers associated with one or more target access point identifier. The device identifier uniquely identifies a multi-mode wireless communication device within a maximum proximity of a target access point identified by the target access point identifier. The WWAN system applies the device-AP association list to efficiently manage handoffs from the WWAN system to access points in the mesh network.

19 Claims, 7 Drawing Sheets

U.S. PATENT DOCUMENTS

| | | |
|---|---|---|
| 2005/0090277 A1 | 4/2005 | Islam et al. |
| 2005/0197132 A1 | 9/2005 | Lee et al. |
| 2005/0237963 A1 | 10/2005 | Storm |
| 2005/0282494 A1 | 12/2005 | Kossi et al. |
| 2006/0025138 A1* | 2/2006 | Kotzin ............... 455/445 |
| 2006/0040656 A1 | 2/2006 | Kotzin |
| 2006/0056448 A1 | 3/2006 | Zaki et al. |
| 2006/0073840 A1* | 4/2006 | Akgun et al. ........... 455/456.3 |
| 2006/0114885 A1 | 6/2006 | Baek et al. |
| 2006/0121916 A1 | 6/2006 | Aborn et al. |
| 2006/0268902 A1 | 11/2006 | Bonner |
| 2007/0002813 A1 | 1/2007 | Tenny et al. |
| 2007/0010261 A1* | 1/2007 | Dravida et al. ........ 455/456.3 |
| 2007/0021127 A1 | 1/2007 | Zheng |
| 2007/0049276 A1 | 3/2007 | Rimoni et al. |
| 2007/0058598 A1* | 3/2007 | Ling ..................... 370/338 |
| 2007/0104139 A1* | 5/2007 | Marinier et al. ........... 370/329 |
| 2007/0121560 A1 | 5/2007 | Edge |
| 2007/0140190 A1 | 6/2007 | Rensburg et al. |
| 2007/0149211 A1 | 6/2007 | Dunn et al. |
| 2007/0177530 A1 | 8/2007 | Ando et al. |
| 2007/0184845 A1 | 8/2007 | Troncoso |
| 2007/0254620 A1 | 11/2007 | Lindqvist et al. |
| 2008/0130555 A1 | 6/2008 | Kalhan |
| 2008/0130596 A1 | 6/2008 | Kalhan |
| 2008/0130597 A1 | 6/2008 | Kalhan |
| 2008/0153497 A1 | 6/2008 | Kalhan |
| 2008/0261615 A1 | 10/2008 | Kalhan |
| 2009/0213819 A1 | 8/2009 | Kalhan |
| 2009/0215400 A1 | 8/2009 | Chang et al. |

FOREIGN PATENT DOCUMENTS

| | | |
|---|---|---|
| EP | 1816888 | 8/2007 |
| EP | 1986341 | 10/2008 |
| JP | 07-154848 | 6/1995 |
| JP | 2005-110314 | 4/2005 |
| WO | WO 98/19474 | 5/1998 |
| WO | WO 02/054820 A2 | 7/2002 |
| WO | WO 04/002051 | 12/2003 |
| WO | WO 2004/054153 | 6/2004 |
| WO | WO 2004/057815 | 7/2004 |
| WO | WO 2004/084463 A2 | 9/2004 |
| WO | WO 2005/076639 | 8/2005 |
| WO | WO 2007/064822 | 6/2007 |
| WO | WO 2008/066926 | 6/2008 |
| WO | WO 2008/066927 | 6/2008 |
| WO | WO 2008/066928 | 6/2008 |
| WO | WO 2008/066929 | 6/2008 |
| WO | WO 2008/091412 | 7/2008 |
| WO | WO 2009/067700 | 5/2009 |

OTHER PUBLICATIONS

Carstens, Juergen, "A Method for Interference Control and Power Saving for Home Access Point", IP.Com Journal, Dec. 13, 2007, pp. 1-3, West Henrietta, NY US.

Alejandro R. Holman and Edward G. Tiedemann Jr., "CDMA Intersystem Operations", 1994 IEEE 44th Vehicular Technology Conference, Jun. 8, 1994. pp. 590-594, Stockholm Sweden.

\* cited by examiner

MANAGEMENT OF WLAN AND WWAN COMMUNICATION SERVICES TO A MULTI-MODE WIRELESS COMMUNICATION DEVICE

RELATED APPLICATIONS

This application is related to U.S. Patent Application entitled "APPARATUS, SYSTEM AND METHOD FOR MANAGING WIRELESS LOCAL AREA NETWORK SERVICE TO A MULTI-MODE PORTABLE COMMUNICATION DEVICE", Ser. No. 11/565,266, U.S. Patent Application entitled "DETECTION OF A MULTI-MODE PORTABLE COMMUNICATION DEVICE AT A MESH NETWORK", Ser. No. 11/565,323, and U.S. Patent Application entitled "APPARATUS, SYSTEM AND METHOD FOR MANAGING WIRELESS LOCAL AREA NETWORK SERVICE BASED ON A LOCATION OF A MULTI-MODE PORTABLE COMMUNICATION DEVICE", Ser. No. 11/565,383, all filed concurrently with this application and all incorporated by reference in their entirety, herein.

TECHNICAL FIELD

The invention relates in general to wireless communication systems and more specifically to management of wireless local area network (WLAN) and wireless wide area network (WWAN) services to a multi-mode wireless communication device.

BACKGROUND

Wireless local area networks (WLANs) and wireless wide area networks (WWANs) provide wireless communication services to portable devices where the WLANs typically provide services within geographical service areas that are smaller than the geographical areas serviced by WWANs. Examples of WWANs include systems that operate in accordance with 2.5G (such as cdma2000), 3G (such as UMTS, WiMax), and other types of technologies, where each base station of the WWAN is typically designed to cover a service area having a size measured in miles. The term WWAN is used primarily to distinguish this group of diverse technologies from WLANs that typically have smaller service areas on the order of 100 to 1000 feet per base station. Base stations in WLANs are typically referred to as access points. An access point may be connected to the Internet, intranet, or other network through wires or wirelessly through a WWAN. Examples of WLANs include systems using technologies such as Wi-Fi and other wireless protocols in accordance with IEEE 802.11 standards. WLANs typically provide higher bandwidth services than WWANs at the expense of non-ubiquitous coverage whereas WWANs provide increased coverage areas at the cost of bandwidth and/or capacity. In order to provide a wireless user with the increased overall performance and continuous connectivity, multi-mode and dual-mode portable communication devices have been developed allowing the communication device to access the particular type of network that provides the most desirable tradeoffs. A multi-mode wireless communication device includes the appropriate components and functionality for communicating within more than one network. For example, a dual-mode portable communication device can communicate within a WWAN and a WLAN.

WLANs are often configured within a mesh network where several access points are managed by one or more WLAN controllers. The WLAN controller manages and controls system-wide functions and the access points manage and control local functions such as communication setup and acknowledgement (handshaking), and establishing beacons for mobile devices.

Unfortunately, conventional techniques for managing the connection status between the portable communication device and the access point are limited in that they require GPS location information or include inefficient searching mechanisms executed by the portable communication device in order to establish service with a new network or performing a handoff between networks. For example, some conventional systems require the mobile communication device to periodically tune to an alternate network channel in an attempt to detect an alternate network resulting in significant power consumption with a limited success rate of detecting alternate networks. A conventional mobile communication device must continually, or at least periodically, search for a mesh network to determine if a mesh network is available.

Accordingly, there is a need for an apparatus, system, and method for managing WLAN and WWAN services to multi-mode portable communication devices.

SUMMARY

A mesh network communication system includes a plurality of access points connected to a wireless local area network (WLAN) controller where at least one of the plurality access points is a detection access point (DAP) that receives reverse link (RL) wireless wide area network (WWAN) signals transmitted from a multi-mode wireless communication device. Based on an intercepted RL WWAN signal, the DAP forwards reverse link (RL) information to the WLAN controller. Based on the RL information, the WLAN controller generates and sends, to the WWAN communication system, a device to access point association list (device-AP association list) comprising one or more device identifiers associated with one or more target access point identifiers. The device identifier uniquely identifies a multi-mode wireless communication device within a maximum proximity of a target access point identified by the target access point identifier. The WWAN system applies the device-AP association list to efficiently manage handoffs from the WWAN system to access points in the mesh network.

DETAILED DESCRIPTION

Figure 1A:
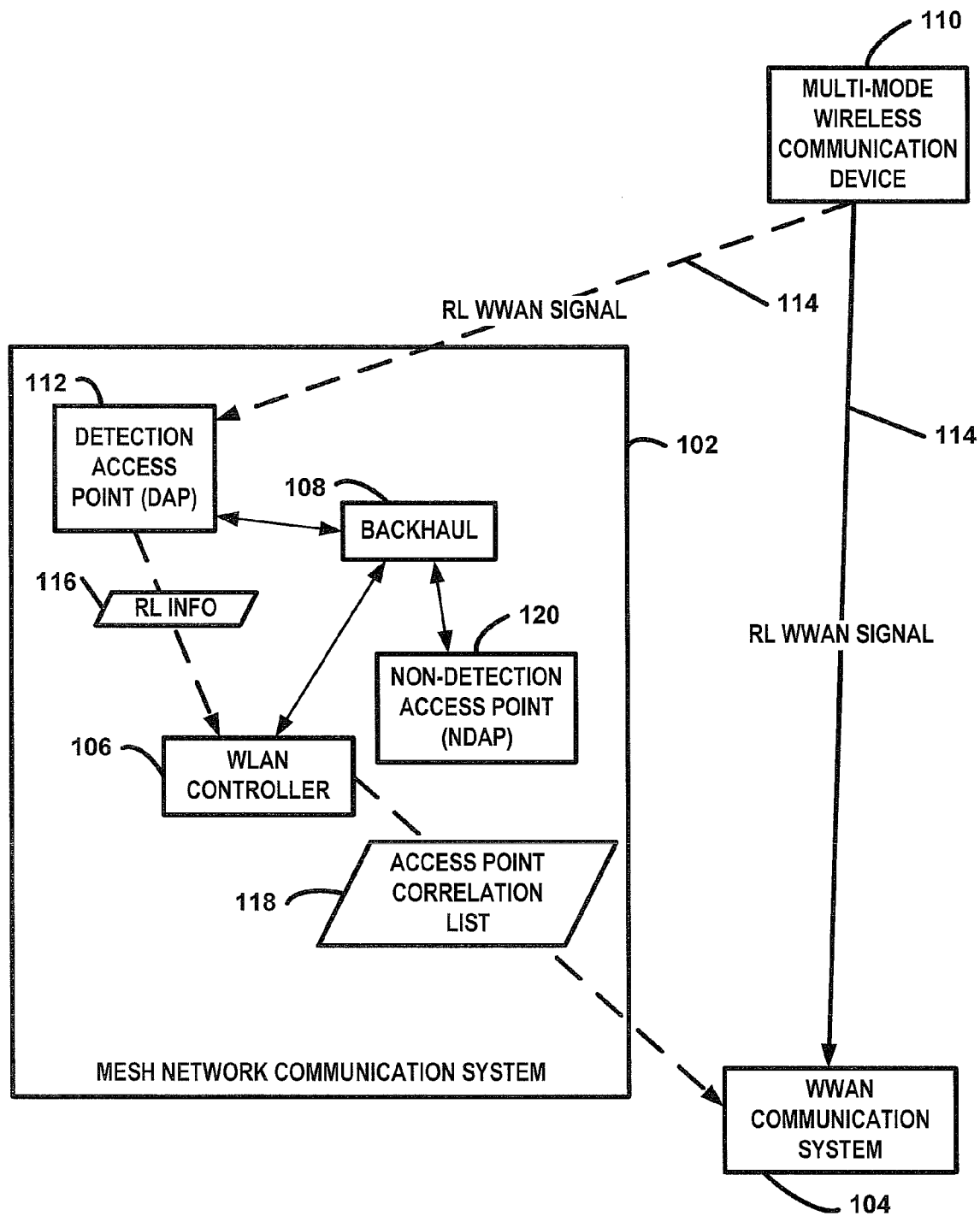
FIG. 1A is a block diagram of a communication network arrangement including a mesh network communication system and a wireless wide area network (WWAN) communication system in accordance with the exemplary embodiment of the invention.

FIG. 1A is a block diagram of a communication system arrangement 100 including a mesh network communication system 102 and a WWAN communication system 104. The mesh network communication system 102 includes a plurality of wireless access points connected to a WLAN controller 106 through a backhaul 108. As discussed in further detail below, a multi-mode wireless communication device (communication device) 110 is wireless device capable of communicating on both systems 102, 104. The plurality of access points includes a plurality of detection access points (DAPS) such as the DAP 112 that intercepts and receives RL WWAN signals 114 transmitted by the communication device 110 to the WWAN communication system 104. The DAP 112 transmits reverse link (RL) information 116 to the WLAN controller 106 where the RL information 116 is based on the received RL WWAN signal 114. The WLAN controller 106 sends a message containing a device to access point association list (device-AP association list) 118 based on the RL information 116 and, in some circumstances, other factors. The device-AP association list 118 is any type of message that includes data associating at least one access point with at least one multi-mode wireless communication device to indicate that the multi-mode communication device is within a maximum proximity of the access point. The device-AP association list 118, for example, may include a list of access point identifiers associated with a list of device identifiers where each access point identifier uniquely identifies an access point that at least potentially can provide WLAN service to at least one multi-mode wireless communication device identified by the device identifier. Accordingly, if the WLAN controller determines that a multi-mode wireless communication device is potentially within a service area of an access point, the access point identifier of the access point is included in the device-AP association list 118 and associated with the device identifier of the multi-mode communication device within the service area. In the exemplary embodiment, the WWAN communication system 104 utilizes the device-AP association list 118 to determine if one more multi-mode wireless communication devices should be handed off to the mesh network communication system and to identify a preferred access point for the hand off. In some circumstances, a device proximity message may be sent to the WWAN communication system to provide an indication of the distance(s) between the communication device 110 and one or more access points. Examples of such a technique are discussed in the related applications incorporated by reference.

The plurality of access points also includes one or more non-detection access points (NDAPs) 120 that do not transmit RL information 116 to the WLAN controller 106. In some circumstances, an NDAP may have the capability to receive RL WWAN signals and to transmit RL information 116 but is configured not to transmit the RL information 116. Also, some of the NDAPs may not have the capability to receive RL WWAN signals. In the exemplary embodiment, an access point with DAP capabilities is dynamically configured to be a DAP or NDAP. As discussed in further detail below, such a dynamic arrangement may be useful where conditions change. For example, reconfiguring an access point as a DAP or NDAP may be appropriate and efficient in response to expansion and contraction of WWAN service areas.

Determining which access points will operate as DAPs in a particular mesh network communication system 102 may be based on any suitable criteria including any number of factors. Examples of some suitable factors include physical characteristics such as building locations, building entrances, building exists and geographic characteristics, WWAN and WLAN service area characteristics, network capacities, and traffic flow of communication devices. An exemplary technique of selecting DAPs is based on a relationship between access point service areas and a criteria area as discussed in the related patent application entitled "DETECTION OF A MULTI-MODE PORTABLE COMMUNICATION DEVICE AT A MESH NETWORK", serial number 11/565,323 and filed concurrently with this application. As discussed in the related application, an access point that is selected to be a DAP has a DAP service area that at least partially overlaps with the criteria area and is not completely surrounded by other access points services areas that have at least a portion that overlaps with the criteria area. In other words, a DAP service area is not surrounded by other DAP service areas in the exemplary embodiment.

Figure 1B:
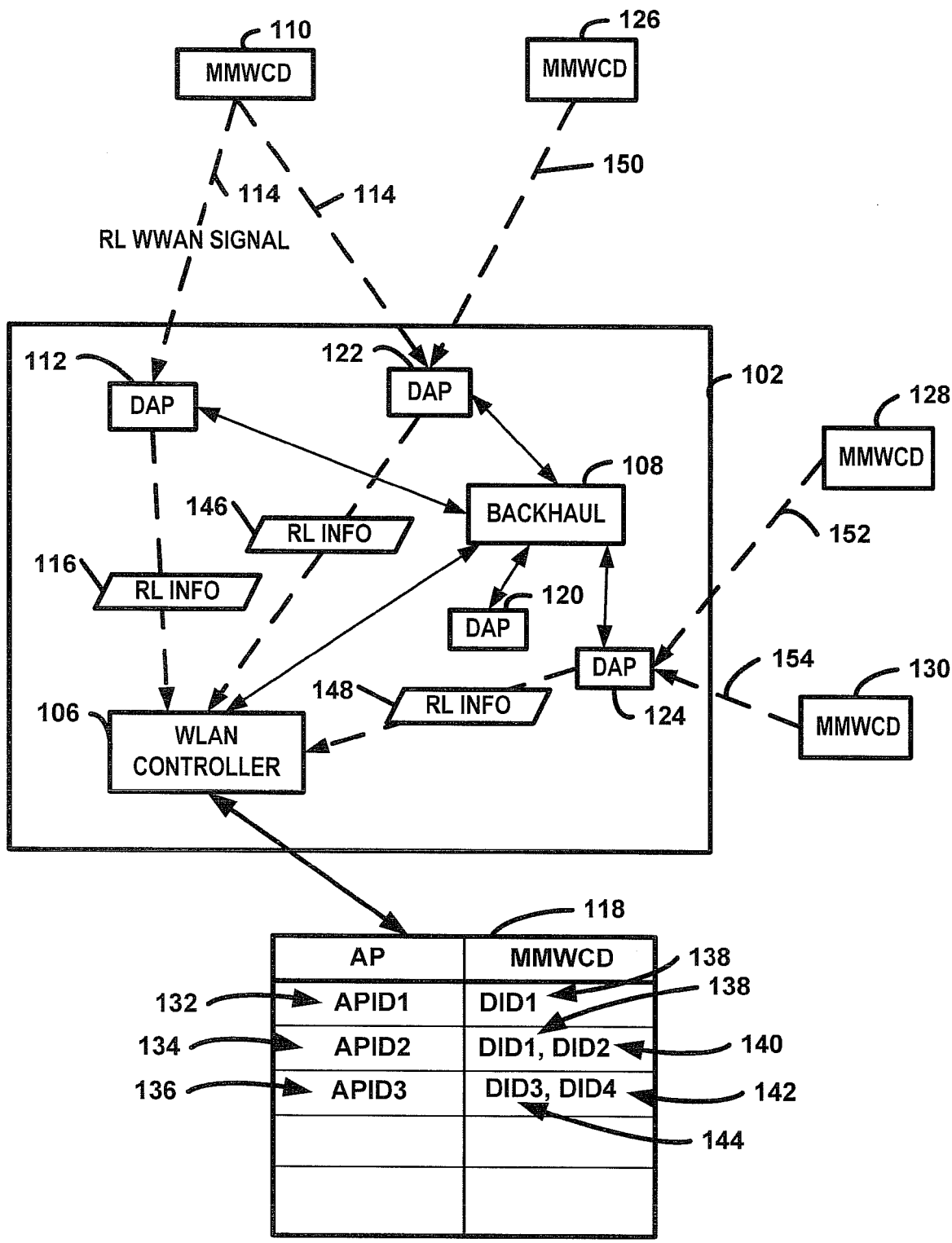
FIG. 1B is a block diagram of the mesh network communication system with an exemplary device to access point association list (device-AP association list).

FIG. 1B is a block diagram of the mesh network communication system 102 with an exemplary device-AP association list 118. Only four access points 112, 122, 120, 124 are shown in FIG. 1B in the interest of brevity and clarity. Any number of DAPs and NDAPs may form a mesh network communication system 102. Access points 112, 122, 120, 124, provide WLAN service within WLAN service areas within the mesh network service area to collectively form the mesh network service area. The access points include a plurality of detection access points (DAPs) 112, 122, 124 that provides WLAN service within DAP service areas and at least one non-detection access point (NDAP) 120 for providing WLAN service within a NDAP service area.

A wireless wide area network (WWAN) communication system 104 provides WWAN services to WWAN devices within a WWAN service area (not shown). The multi-mode wireless communication devices 110, 126, 128, 130, are capable of operating in both systems 102, 104 and can receive WWAN services and WLAN services. As described above, the term WWAN is used primarily to distinguish this group of diverse technologies from WLANs that typically have smaller service areas on the order of 100 to 1000 feet per base station. Accordingly, the WWAN communication system 104 is any system that provides wireless communication services within relatively large geographical areas as compared to WLANs. Examples of WWAN systems 104 include cellular communication systems that provide cellular communication services through at least one base station connected to a WWAN infrastructure such as a cellular system infrastructure.

The access points 112, 120, 122, 124 are any devices capable of providing wireless local area network (WLAN) services and that can communicate with a WLAN controller 106. Although the access points are fixed access points that are connected through a wireless backhaul 108 to the WLAN controller 106 in the exemplary embodiment, the access points may be connected to the WLAN controller 106 through wired backhaul 108 in some circumstances. A suitable backhaul 108 is a backhaul operating in accordance with IEEE 802.11(a) standards. Each of the access points provides WLAN service to communication devices 110 within adequate range of the access point. An example of a suitable technique for providing WLAN service includes operation in accordance with a WLAN protocol such as WiFi or any of the protocols defined in the IEEE 802.11 standards.

The WLAN controller 106 is any device that can manage and control communications within the mesh network communication system 102. In the exemplary embodiment, the WLAN controller 106 includes hardware and software for performing calculations, communicating with the WWAN communication system 104 and with the access points 112, 120, 122, 124 and facilitating the overall functionality of the mesh network communication system 102. The exemplary mesh network communication system 102 utilizes a split media access control (MAC) architecture where processing of data and management protocols is distributed over the WLAN controller and the access points. The WLAN controller 106 generally provides processing of data and management protocol on the system level and the access points manage local functions such handshaking with mobile devices and providing beacons. Messages sent from the WLAN controller to the WWAN communication system 104 may be sent using any combination of wired and/or wireless communication methods. In the exemplary embodiment, the WLAN controller 106 is connected to an access gateway in a core network and sends messages using packet switched data techniques, either through an IP network or through an access router that may be part of a network interface within the WLAN controller 106. In some circumstances, messages can be sent from the WLAN controller 106 through a PSTN. In other circumstances, a transmitter may be used to wirelessly transmit the messages to the base station which are then forwarded to the WWAN infrastructure. The WLAN controller 106 may be an access point with assigned controller responsibilities for the mesh network communication system 102 in some situations.

The multi-mode wireless communication device 110 is any type of communication device that is capable of communicating with at least one WLAN system and at least one WWAN system 104. The multi-mode wireless communication device 110, sometimes referred to as an access terminal, may be a wireless modem, a personal digital assistance, dual mode cellular telephone, or other such device.

Accordingly, the access points 112, 120, 122, 124 facilitate communication to a WLAN of the mesh network communication system 102 and the WWAN communication system 104 facilitates communication to a WWAN, where the communication device 110 is capable of communicating on both of the networks. The communication device 110 can access wireless services provided by either of the networks when resources are available on the particular network and signal quality is adequate. In the exemplary embodiment, the communication device 110 may access both networks simultaneously under certain conditions. In some circumstances, however, the communication device 110 may be able only to access one of the networks at any given time. In another scenarios, the communication device 110 may be able to access only control channels of the WWAN network but have full access of WLAN network or vice versa. The coverage area of the WWAN communication system 104 may have poor quality areas or areas where no WWAN service is available. These areas, however, may have good coverage from a WLAN system. Such a scenario may occur where the WLAN coverage is within a building such as an office or home and the WWAN coverage is generally available in the area of the building but lacking within the building due to walls and other signal obstructions. In addition to other advantages, managing wireless services in accordance with the exemplary embodiments maximizes the quality of the wireless services provided to the communication devices 110.

In accordance with the exemplary embodiment, the mesh network communication system 102 provides information to the WWAN system 104 identifying access points that at least potentially may provide WLAN service to communication devices 110, 126, 128, 130. The WLAN controller 106 evaluates reverse link WWAN signals transmitted by the multi-mode communication devices 110, 126, 128, 130 and received at one or more DAP access points 112, 122, 124. Based at least partially on a calculated or estimated proximities of the communication devices 110, 126, 128, 130 to the one or more DAP access points 112, 120, 124, the mesh network communication system 102 sends device-AP association list 118 to the WWAN communication system 104. The exemplary device-AP association list 118 in FIG. 1B includes a plurality of access point identifiers (APIDs) 132, 134, 136 and a plurality of device identifiers (DIDs) 138, 140, 142, 144. Each APID uniquely identifies an access point and each DID uniquely identifies a communication device 110, 126, 128, 130. Each APID is associated with one more DIDs indicating that the communication devices identified by the DIDs are within a maximum proximity of the associated access point identified by the APID. In the exemplary embodiment, the device-AP association list 118 also indicates that identified access point is available to provide WLAN service to the one or more corresponding communication devices. The association between APIDs and DIDs may be indicated in any one numerous ways. An example of a suitable technique includes storing APIDs and DIDs within particular locations within a data file. Such a file, for example, may represent a table with list of APIDs and list of corresponding DIDs.

The device-AP association list 118, therefore, may be any kind of data file, message, or other type of communication that indicates the association between access points and corresponding communication devices that are within a maximum proximity of the access point. The WLAN controller 106 generates the device-AP association list 118 based on reverse link information 116, 146, 148 received from the DAPs 112, 122, 124. The reverse link signal information 116, 146, 148 may include, or be based on, any of numerous measured or calculated parameters related to a received RL WWAN signals 114, 150, 152, 154. In the exemplary embodiment, a transmission time, a reception time, and reception power are included in the RL signal information 116, 146, 148 that is sent to the WLAN controller 106. The WLAN controller 106 evaluates the information to generate the device-AP association list 118 to be sent to the WWAN communication system 104. In some implementations, however, at least some of the evaluation of the RL WWAN signals may be performed by the access point receiving the RL WWAN signal. For example, the DAP can calculate a time offset equal to the time difference between the signal transmission time and the signal reception time.

For the example shown in FIG. 1B, a DAP 112 receives a WWAN RL signal 114 from a communication device 110. Another DAP 122 receives the WWAN RL signal 114 as well as another WWAN RL signal 150 from another communication device 126. A third DAP 124 intercepts a WWAN RL signal 152 transmitted by a third communication device 128 and a WWAN RL signal 154 transmitted from a fourth communication device 130. As explained above, the WWAN RL signals are transmitted by the communication devices to WWAN base stations. In the interest of brevity and clarity the base stations and communications between the communications devices and the base stations are not shown in FIG. 1B. Based on the WWAN RL signal 114 and the reverse link signal 150, the DAP 112 generates the reverse link information 116. The other DAP 122 generates the reverse link information 146 based on the WWAN RL signal 150 received from the communication device 126. The reverse link information 148 is based on the WWAN RL signals 152, 154. The WLAN controller 106 processes the RL information 116, 146, 148 to at least estimate a proximity of each communication device 110, 126, 128, 130 to at least one of the DAPs 112, 122, 124. In the exemplary embodiment, the WLAN controller 106 identifies the DAPs that are at most likely able to provide WLAN services to a communication device. Such identification and determination of target access points may be based on any of several factors and parameters. For example, in addition to the estimated proximity of a communication device to a DAP, the WLAN evaluates the capacity of the DAP to determine if an access point should provide service to a communication device. In some cases, multiple DAPs may be identified as target access points to provide service to a communication device. The target access points, therefore, are candidate access points that are likely able to provide service to a target communication device. In the exemplary embodiment, the WWAN system 104 makes the final determination whether to invoke a handoff procedure from the WWAN system 104 to a DAP. Accordingly, the WWAN system 104 may determine that a particular target DAP should not provide WLAN service to the communication device. For example, a quality of service (QoS) requirement of a communication device may prevent the WWAN system 104 from invoking a hand off.

Continuing with the example in FIG. 1B, the WLAN controller 106 generates the device-AP association list 118 based on the reverse link information 116, 146, 148 to associate an access point identifier (APID1) 132 of the access point 112 to a device identifier (DID1) 138 of the communication device 110. Accordingly, for the example, the WLAN controller 106 has determined that the communication device 110 is a target communication device within a maximum proximity of the DAP 112 and that the DAP 112 is a target DAP 112 to be associated with the target communication device 110.

In the example, the WLAN controller 106 evaluates the reverse link 146 information to determine that another DAP 122 is a target DAP 122 to be associated with the target communication device 110. Further the WLAN controller 106 determines that DAP 122 is a target DAP 122 with the maximum proximity of another communication device 126. Accordingly, the target DAP 122 is associated with two communication devices 110, 126 by associating the access point identifier (APID2) of the DAP 122 with the device identifier (DID1) 138 of the communication device 110 and the device identifier (DID2) 140 of the other communication device 126. In some circumstances, the reverse link information 146 received from one DAP 122 may be used to determine whether another DAP 112 should be associated with a particular target communication device 110. For example, the WLAN controller 106 may calculate or estimate the proximity of the target communication device 110 to the target DAP 112 based on the reverser link information 146 related to the WWAN RL signal 114 received at the DAP 122.

Also in this example, the DAP 124 is determined to be a target DAP 124 that is at least potentially able to provide WLAN services to two other communication devices 128, 130 based on the reverse link information 148 received from the DAP 124. Accordingly, the device-AP association list associates the access point identifier (APID3) 136 with the communication device identifier (DID3) 142 and the communication identifier (DID4) 144.

The access point identifiers and the device identifiers may be in any of numerous formats or forms that may depend on the particular implementation. Examples of suitable formats include conventional techniques used in mesh networks. For example, an electronic serial number (ESN) may be used as a device identifier.

The WWAN communication system 104 evaluates the device-AP association list 118 and may perform or initiate the acquisition procedure of WLAN wireless service to one or more of the target communication devices 110, 126, 128, 130 in response to the device-AP association list 118. The acquisition may result in a handoff of the communication device 110 from the WWAN to the mesh network 102 in some circumstances or may result in the communication device 110 receiving wireless service from two networks simultaneously. Further, the communication device 110 may maintain registration with the WWAN system 104 although user data is only exchanged on the mesh network 102. In the exemplary embodiment, the device-AP association list 118 is sent through either an IP network or an access router to an access gateway in the WWAN. In some circumstances, however, the device-AP association list 118 is sent through a wireless link. For example, the message could be sent as a reverse link WWAN signal where the WLAN controller 106 includes a WWAN transmitter.

Therefore, when the WWAN communication system 104 is providing wireless communication services to the communication device 110, the DAP access points 112, 122, 124 at least periodically, monitor the WWAN reverse link channel used by the communication device 110 to transmit WWAN reverse link signals. As mentioned above, the access points 112, 122, 124 employ procedures to detect multiple multi-mode communication devices 110. Based on the WWAN reverse link signal received at the DAP access point 112, 122, the DAP access point 112, 122, 124 transmits the RL signal information 116, 146, 148 to the WLAN controller 106. Based on the RL signal information, 116, 146, 148 the WLAN controller 106 generates the device-AP association list that is sent to the WWAN system 104.

In some situations, the WLAN controller 106 dynamically assigns the access points to operate as DAPs 112 or as NDAPs 120. Examples of dynamic access point assignment are described in the related patent application entitled "DETECTION OF A MULTI-MODE PORTABLE COMMUNICATION DEVICE AT A MESH NETWORK", Ser. No. 11/565,323, filed concurrently with this application.

Figure 2:
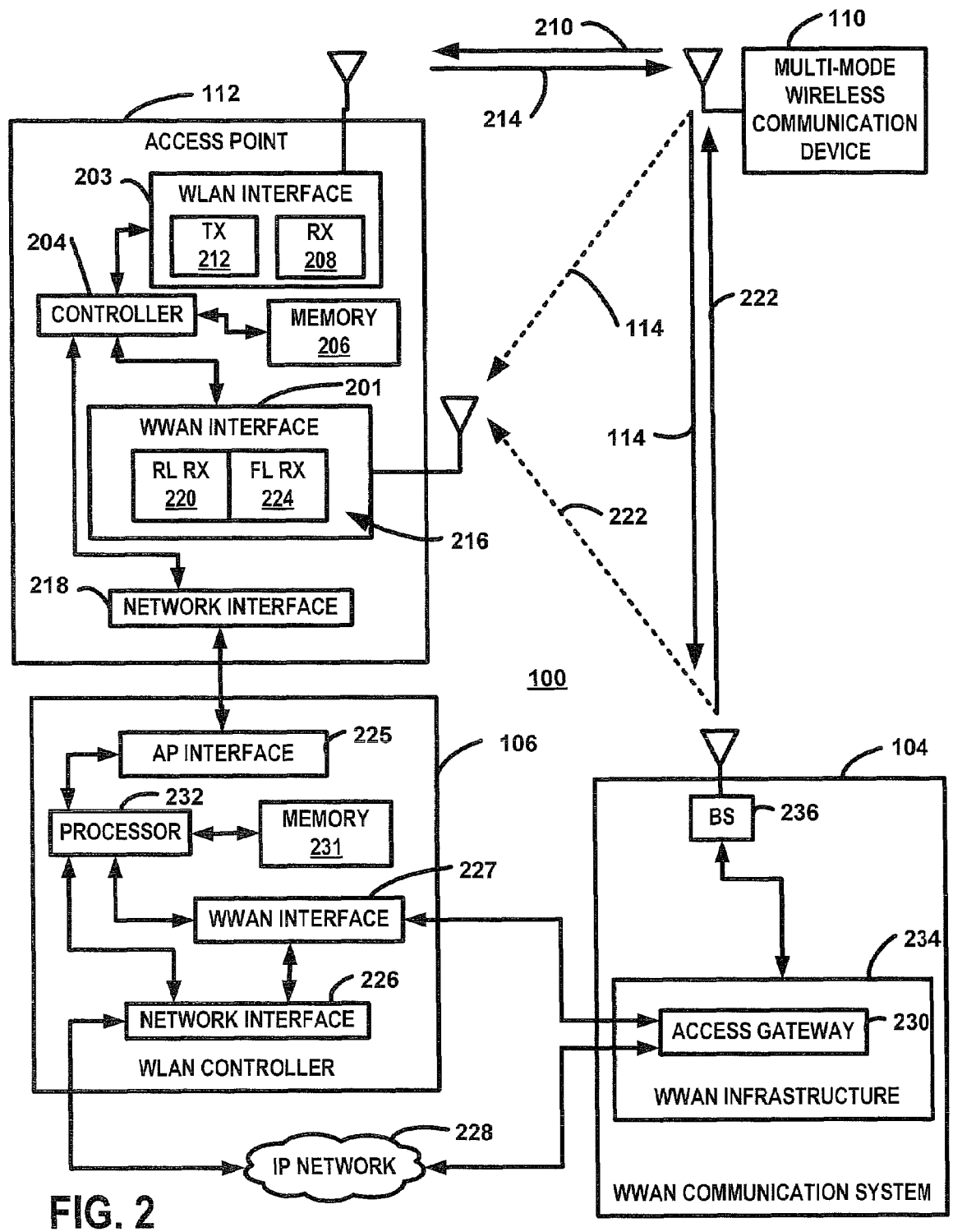
FIG. 2 is a block diagram of the communication network arrangement where the access point receives reverse link WWAN signals from the communication device.

FIG. 2 is a block diagram of the communication network arrangement 100 where a DAP access point 112 receives reverse link (RL) WWAN signals 114 from the communication device 110. Accordingly, discussion with reference to FIG. 2 is directed to a single access point 112 and a single communication device 110. The principles may be expanded to any number of communication devices 110 and access points 112.

The WWAN infrastructure 234 may include one or more core networks that are connected to a global network such as Internet Protocol (IP) network 228 or public switched telephone network (PSTN). In the exemplary embodiment, the WWAN communication system 104 operates using packet switching communication techniques. In such systems, the communication infrastructure is a packet switched core network and includes an access gateway 230 for interfacing to WLANs using IP signaling. The WWAN communication system 104, however, may operate in accordance with circuit switched communications in some circumstances. The WWAN communication system 104 may operate using any of numerous protocols and schemes. Examples of some Code Division Multiple Access (CDMA) standards include cdma2000 1x, 1xEV-DO, and W-CDMA. In some circumstances, the WWAN communication system 104 may operate with other standards such as OFDM based standards or GSM standards, for example. In an embodiment discussed below, the WWAN system 104 is an OFDM system that operates in accordance with IEEE 802.16(e) standards often referred to as WiMax. The various functions and operations of the blocks described with reference to the WWAN communication system 104 may be implemented in any number of devices, circuits, or elements. Two or more of the functional blocks may be integrated in a single device and the functions described as performed in any single device may be implemented over several devices. For example, at least portions of the functions of the WWAN infrastructure 234 may be performed by the base station 236, a base station controller, or the MSC in some circumstances.

The DAP access point 112 includes a WWAN interface 201 for communicating with the WWAN system 104 and the WLAN interface 203 for providing WLAN service to one or more communication devices such as the multi-mode wireless communication device 110. The DAP access point 112 further comprises a controller 204 coupled to the WWAN interface 201 and the WLAN interface 203. The controller 204 performs the control functions described herein as well as performing other functions and facilitating the overall operation of the DAP access point 112. The controller 204 is connected to or includes a memory 206 that may include one or more RAM and or ROM memory devices, for example. The WLAN interface 203 includes a WLAN receiver 208 for receiving reverse link WLAN signals 210 and a WLAN transmitter 212 for transmitting WLAN signals 214. The signals 210, 214 are transmitted and received in accordance with a WLAN protocol. Examples of a suitable WLAN protocols include protocols in accordance with the IEEE 802.11 protocol and wireless fidelity (WiFi). In some circumstances, the access point 112 may also include a wired LAN interface (not shown) for communicating with devices connected to the access point 112 through wires.

A WWAN interface 201 includes any combination of hardware, software and/or firmware adequate to at least detect WWAN RL signals 114. In the exemplary embodiment, the WWAN interface 201 includes a WWAN receiver 216 that can be configured to receive reverse link WWAN signals 114 transmitted from a multi-mode wireless communication device 110. In the exemplary embodiment, the WWAN receiver 216 can be configured as a reverse link WWAN receiver 220 for receiving reverse link WWAN signals 114 and as a forward link WWAN receiver 224 for receiving WWAN forward link signals 222 from a base station 236. In some circumstances, two separate WWAN receivers may be used to implement the WWAN reverse link and forward link receivers 220, 224. The forward link receiver 224 is used to obtain reverse link control information such as reverse link scheduling information transmitted by the base station. Also, in some implementations, the capability to receive WWAN forward link signals 222 may be omitted. In some situations at least some WWAN scheduling information may be received by the WLAN controller 106 through a wired link from the WWAN system 104 and forwarded to the DAP 112.

The network interface 218 exchanges messages with an access point (AP) interface 225 in the WLAN controller 106. In the exemplary embodiment, the backhaul 108 is a wireless backhaul operating in accordance with 802.11(a) standards and the network interface 218 and the AP interface 225 are 802.11(a) transceivers. In some cases, the backhaul 108 may include a packet switched wired network such as the Internet, microwave point-to-point link, fiber optic cable, or other wired or wireless communication media.

In addition to other information, the memory 206 stores the communication device identification values (device identifiers) corresponding to each communication device 110 that is authorized to use the mesh network communication system 102. The device identifier may include an electronic serial number (ESN) or other unique data. The device identifiers may be stored at the access point 112 using any of numerous techniques. An example of a suitable method of storing the values includes storing the device identifiers during an initialization procedure performed when the access point 112 is installed. The device identifiers, however, may be periodically updated in some cases.

The access point 112 monitors the reverse link WWAN channel(s) that may contain a reverse link WWAN signal 114 transmitted from a communication device 110 that is not currently receiving WLAN service from the mesh network 102. The reverse link WWAN receiver 216 is tuned, or otherwise configured, to receive the reverse link WWAN signals 114. Based on one or more received WWAN RL signals 114, the controller 204 generates a RL information message 116. As described above, the RL information 116 includes information that allows the WLAN controller 106 to calculate, or at least estimate, the proximity of the communication device 110 to the DAP access point 112. In the exemplary embodiment, the RL signal information includes the power level and timing information of the received RL WWAN signal. An example of a suitable content of the information includes transmitting the reception time, transmission time, and received power level of the received RL WWAN signal 114. An example of a suitable format for the timing information includes a time offset indicating a difference between a reference point in the RL signal and a time reference. In some circumstances, the timing offset may be a time difference between a reception time of the signal and a transmission time of the signal, where the transmission time is provided by the WLAN controller 106 or determined by the access point 112 by intercepting RL control information transmitted on the forward link by the base station 236. In some circumstances, the controller 204 may calculate or estimate the proximity of the communication device 110 to the access point 112. The RL information 116, therefore, may be the proximity of the communication device 110 to the access point 112 in some circumstances.

The WLAN controller 106 manages system level functions of the mesh network communication system 102 and includes any combination of hardware, software and/or firmware for performing the management functions discussed herein as well as facilitating the overall functionality of the mesh network. The various functions and operations of the blocks described with reference to the WLAN controller 106 may be implemented using any number of devices, circuits, or elements. Two or more of the functional blocks may be integrated in a single device and the functions described as performed in any single block may be implemented over several devices. For example, at least some of the functions of the WWAN interface 227 may be performed by the network interface 226. The WLAN controller includes the AP interface 225 for communicating with the access points 112, 120, 122, 124 and a network interface 226 for connecting to an internet protocol (IP) network 228. A WWAN interface 227 exchanges message with an access gateway 230 in the WWAN communication system 104 the. In some circumstances, the WWAN interface 227 may communicate with the WWAN system 104 through the IP network 228. The network interface 226, therefore, provides packet data communications and facilitates access to the Internet and to the access gateway 230 in the WWAN infrastructure 234.

In addition to other information, the memory 231 stores device identifiers corresponding to each communication device 110 that is authorized to use the mesh network communication system 102. Further, the access point identifiers corresponding to the access points are also maintained in memory 231.

The WLAN controller 106 receives the RL information 116, 146, 148 from the DAP 112 through the AP interface 225. A processor 232 determines the proximity of the communication device 110 to the DAP 112 based on the RL information 116. Where other RL information 146 is received from other DAPs 122, the processor 232 determines the proximity of the communication device 110 to the other DAPs 122. In some circumstances, the processor 232 may determine the proximity to one of the DAPs 112 based on RL information 146 received from one or more other DAPS 122.

In the exemplary embodiment, the proximity is used to determine whether the communication device 110 is within range of one or more access points 112, 122 and able to receive WLAN service from the mesh network communication system 102. The processor 232 in the WLAN controller 106 may determine whether to generate and send the device-AP association list 118 based on factors other than power level and timing. For example, factors may include only the power level of the WWAN RL signal or a factor based solely on the WWAN RL receiver's 220 ability to decode the incoming RL signal. The device-AP association list 118 provide the WWAN system 104 to more efficiently determine if a WLAN network acquisition procedure should be performed for any communication. The determination to generate the device-AP association list 118 and its contents, therefore, may be based on other criteria in addition to the proximity. Any of numerous criteria may be used to determine if WLAN service should be provided by an access point where the criteria may include conditions related to the capacity of the access point 112, the capacity of the mesh network communication network 102 and/or the requirements of the communication device 110. The processor 232 uses the WWAN RL signal to determine if the communication device 110 is within a DAP service area and the mesh network service area. The criteria used to determine whether the communication device 110 is within a WLAN service area of an access point 112 depends on the type of WWAN.

Any of several techniques may be used to determine the proximity of the communication device 110 based on the WWAN RL signal. In the exemplary embodiment discussed below in further detail, a forward link WWAN signal transmitted from the base station to the communication device 110 is intercepted by one of the access points 112, 122, 124 and decoded to determine power level information. The information is forwarded to the WLAN controller 106 where based on the difference in received power and transmitted power of the WWAN RL signal and the signal propagation time, the WLAN controller 106 determines the distance between the communication device 110 and the access point 112 receiving the WWAN RL signal 114. The WLAN controller 106 may also determine distance based only on the difference between the arrival time and transmission time of the WWAN RL signal in some circumstances. In another example, the WLAN controller 106 may determine that the communication device 110 is sufficiently close to include the APID in the device-AP association list 118 if the received power level is above a threshold without information regarding the transmission power level. Another example of a suitable technique of determining proximity includes utilizing multiple antennas or smart antennas to determine the proximity of the communication device 110 to the access point 112 based on the reverse link WWAN signal transmitted by the communication device 110. For example, beam forming antennas may provide distance information to allow the controller to determine whether the communication device 110 is within the WLAN service area. Further, the WLAN controller may use timing and/or power information received from other access points 122 to determine the proximity to the DAP 112. Other techniques or combinations of techniques may be used.

In the exemplary embodiment, the WWAN infrastructure 234 comprises a packet switched core network that includes at least one access gateway 230. The WWAN interface 227 and the network interface 226 may be connected to the access gateway 230 using any combination of wired and wireless connections. Examples of suitable connections include T1 lines, fiber optic cable, coaxial cable, and point-to-point microwave. The access gateway 230 is a communication interface that allows the WLAN controller 106 to communicate with the WWAN infrastructure 234.

During operation, information regarding the power level is determined by intercepting the WWAN FL signals that contains power control information corresponding to each communication device 110. In the exemplary embodiment, information is extracted from the UL MAP transmitted in the WWAN FL signal. The controller processor 232 maintains a current power level of each communication device associated with each stored identification value. In some situations, other information may be required to determine the transmission power of the reverse link WWAN signal. Also, signal timing information may be extracted from the forward link WWAN signal which may be used to calculate a WWAN RL signal propagation time of the WWAN RL signal and, therefore, the proximity of the communication device 110. In some situations, a combination of propagation time, propagation loss and other parameters may be used to determine the proximity.

After determining the proximity of the communication device 110 to the access point 112, the processor 232 determines whether any of the access points 112, 122, 124 should provide WLAN service to the communication device 110. The processor 232 generates the device-AP association list 118 based on proximity and other factors determined. A message containing the device-AP association list 118 is sent to the WWAN communication system 104 either through the WWAN interface 227 or through the network interface 226 and the IP network 228.

The device-AP association list 118 may contain security protocol that assists the core network in identifying the WLAN controller 106. The WWAN infrastructure evaluates the device-AP association list 118 to determine which, if any, communication devices should be instructed to acquire WLAN service. In some situations, the WWAN infrastructure (core network) 234 sends an instruction to the communication device 110 indicating that the communication device 110 should search for a WLAN system. In response to the instruction, the communication device 110 activates and tunes the WLAN interface to search for a WLAN signal in accordance with known techniques. In other situations, the WWAN infrastructure (core network) 234 sends an instruction to the communication device 110 indicating that the communication device 110 should search for the specific access point 112 associated in the correlation list 118 to the communication device. In other situations, the WWAN infrastructure (core network) 234 may instruct the communication device 110 to acquire WLAN service from any access point that is available. Further, the WWAN infrastructure may evaluate parameters related to the multiple target DAPs and an associated communication device to select a preferred DAP to provide DAP service. Any of numerous techniques and algorithms may be used to efficiently manage handoffs to the mesh network communication system 102 based on the information contained in the device-AP association list 118 and other factors and parameters.

Figure 3:
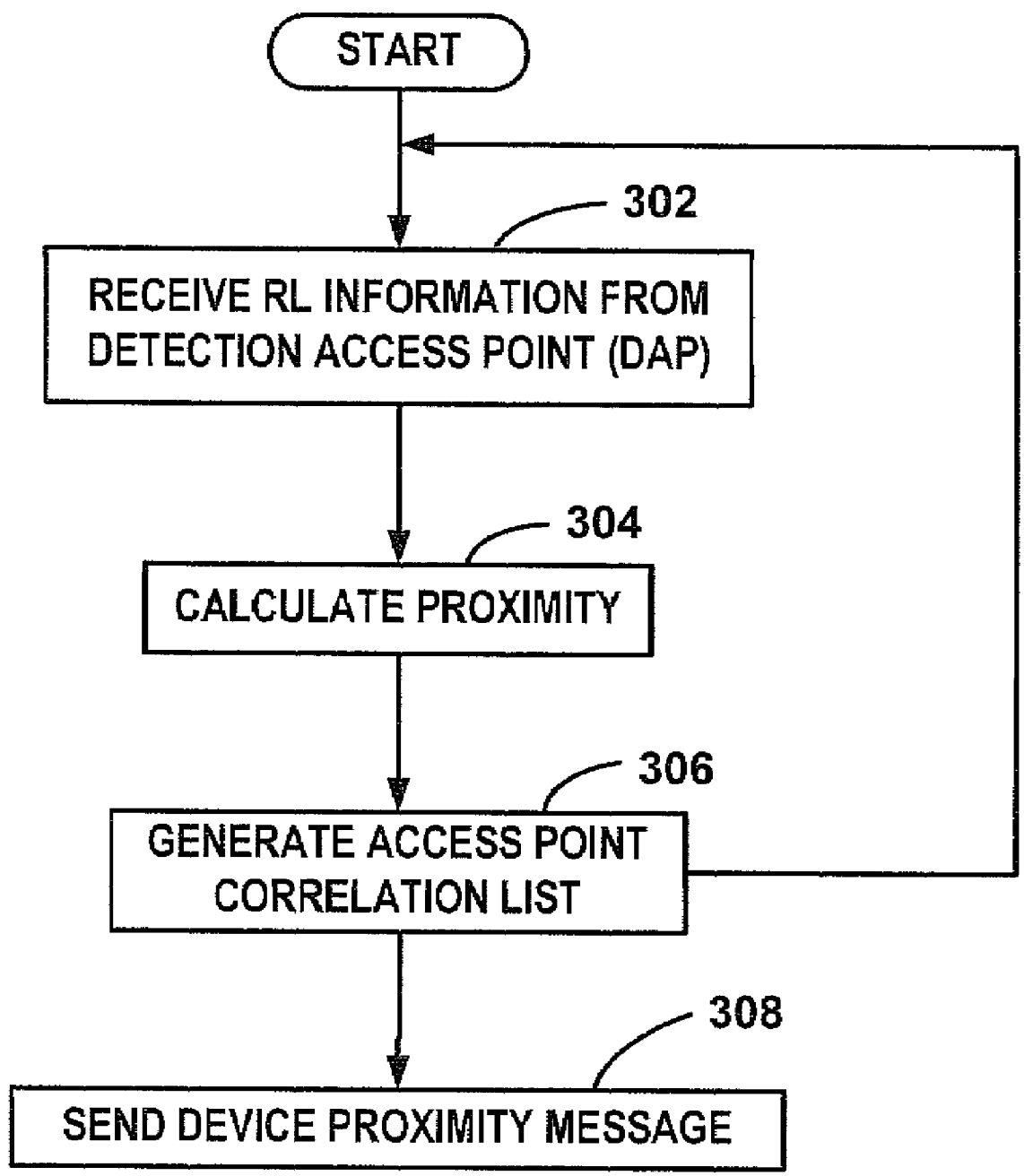
FIG. 3 is a flow chart of a method of managing wireless service to a multi-mode wireless communication device performed in a WLAN controller in accordance with the exemplary embodiment.

FIG. 3 is flow chart of a method of generating the device-AP association list 118 performed in a WLAN controller 106 in accordance with the exemplary embodiment. The method may be performed by any combination of hardware, software and/or firmware. The order of the steps discussed below may be varied and one or more steps may be performed simultaneously in some circumstances. In the exemplary embodiment, the method is performed, at least in part, by executing code on the processor 232 in the WLAN controller 106.

At step 302, reverse link (RL) information 116 (146) is received from one or more DAPs 112 (122, 124). The access point interface 225 receives and decodes the signals transmitted by the DAPs 112, 122, 124) that include the RL information 116, 146, 148. The RL information 116 is forwarded to the processor 232 and includes signal timing and power information in the exemplary embodiment.

At step 304, the proximity of the communication device 110 to at least one DAP 112 is calculated. In the exemplary embodiment, the proximity of the communication device to each DAP 112, 122, 124 providing RL information 116, 146, 148 is calculated. RL information 146 provided by one DAP 122 may be used to calculate the proximity of the communication device 110 to another DAP 112. The proximity calculation may be based on any number of parameters or characteristics of the received WWAN RL signal as well as other factors. Examples of suitable RL information parameters include parameters related to signal power level and a timing offset between a transmission and reception times at a DAP 112. Other related factors may include transmission power level, location of one or more WWAN base stations and information extracted from WWAN RL signals and WWAN FL signals such as time stamps, power level indicators, and power control indicators. The particular factors and calculation techniques depend on the type of WWAN communication system 104. An exemplary technique of acquiring RL information at a DAP 112 suitable for an OFDM based system IEEE 802.16 is discussed with reference to FIG. 6 below.

At step 306, the device-AP association list 118 is generated. Although the device-AP association list 118 may be based solely on the proximities of the communication devices 110, 126, 128, 130 to the DAPs 112, 122, 124 other factors may be considered in some circumstances. Examples of other factors include the capacity of the access points 112, 122, 124, the capacity of the mesh network, the required bandwidth required by the communication devices 110, 126, 128, 130 the current cost of the WWAN service, and the estimated motion of the communication devices.

At step 308, the device-AP association list 118 is sent to the WWAN communication system 104. In the exemplary embodiment, the message containing the list 118 is transmitted by the WWAN interface 227 through either the IP network 228 using the network interface 226 or through a backhaul connection to the access gateway 230 in the WWAN communication system 104. As discussed above, the device-AP association list 118 at least indicates that the communication device 110 may be within range of an access point 112, 122, 124 although other indications and information may be included. The WLAN controller 106 may transmit the list 118 using other techniques. In some circumstances, for example, the list 118 may be transmitted through a WWAN RL channel to the base station 236. The WWAN system 104 may initiate acquisition, of the WLAN service, initiate searching for WLAN service or may initiate a handoff to the access point 112 based on the contents of the list 118.

Figure 4:
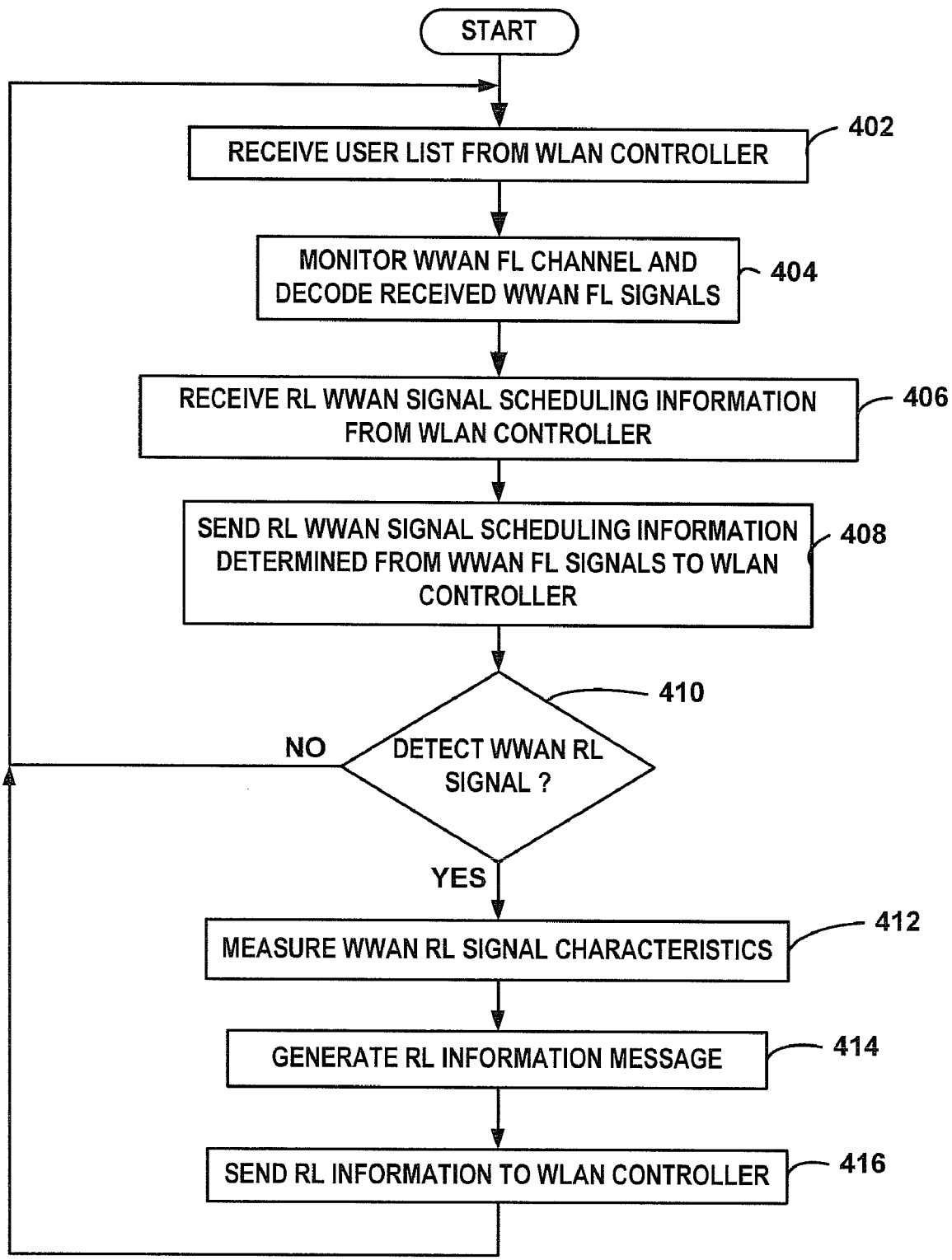
FIG. 4 is a flow chart of a method performed in a peripheral access point in accordance with the exemplary embodiment.

FIG. 4 is a flow chart of a method of managing wireless service to a multi-mode wireless communication device 110 performed in a DAP 112 in accordance with the exemplary embodiment. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 204 in the DAP 112.

At step 402, the DAP 112 receives a user list from the WLAN controller 106. The access point 112 maintains the user list in memory 206. Changes to the user list are contained in the messages transmitted from the WLAN controller 106 to the access point 112 through the backhaul 108. In some circumstances, a new user list may be transmitted while in other circumstances only changes to the user list may be sent. The messages are sent in accordance with any protocol and technique suitable for communication between the WLAN controller 106 and the DAPs 112, 122 through the backhaul 108.

At step 404, the DAP 112 monitors the WWAN FL channel and decodes received WWAN FL signals 222. The forward link (FL) receiver 224 is tuned to FL channels that may contain FL signals transmitted from a base station to any of the communication devices contained in the user list. Intercepted FL signals are decoded an evaluated to determine reverse link scheduling information. In some situations, at least some of the information within the FL signals may be received at the WLAN controller 106 through a wired link and forwarded to the DAP 112.

At step 406, reverse link scheduling information determined by other access points is received from the WLAN controller 106. If reverse link scheduling information has been acquired by other access points 112 and forwarded to the WLAN controller 106, the WLAN controller 106 forwards the reverse link scheduling information to all other DAPs. The DAP 112 stores the information with the associated communication device in the user list in memory 206.

At step 408, the DAP 112 sends reverse link scheduling information extracted from the FL WWAN signals to the WLAN controller 106. The controller 204 compares stored scheduling information, if any, to the scheduling information obtained from the FL WWAN signals and sends the scheduling information to the WLAN controller 106 if the new scheduling information is different from stored information.

At step 410, the WWAN reverse link (RL) channel is monitored and it is determined whether a WWAN RL signal has been received at the DAP 112. The RL WWAN receiver 220 in the WWAN interface at least periodically monitors the WWAN reverse link (RL) channel. In the exemplary embodiment, the WWAN RL receiver 220 is tuned to decode any WWAN RL signals 114 transmitted from any of the communication devices 110 in the user list. The DAP 112 may detect communication devices 110 that are not in the user list but will not be able to decode the signals without identification information. In some circumstances, however, the WWAN RL receiver 220 may be configured to monitor all RL channels. If a WWAN RL signal has been received, the method continues at step 412. Otherwise, the method returns to step 402.

At step 412, the characteristics of the received WWAN RL signal 114 are measured. In the exemplary embodiment, the reception time and power level of the received signal are measured and stored. Other signal characteristics can also be measured. An example of another characteristic includes a signal to noise measurement.

At step 414 a RL information message 116 is generated. One or more RL WWAN signal characteristics are associated with an identifier of the corresponding communication device and formatted within a message suitable for transmission through the backhaul to the WLAN controller 106. In the exemplary embodiment, the signal reception time and the signal power level is formatted within the RL information message 116.

At step 416, the RL information is sent to the WLAN controller 106. The WLAN controller transmits the RL information message through the network interface 218 connected to the backhaul. The RL information message 116 is received by the WLAN controller 106 through the AP interface 225. The method returns to step 402 to continue monitoring forward link and reverse link WWAN channels.

Figure 5:
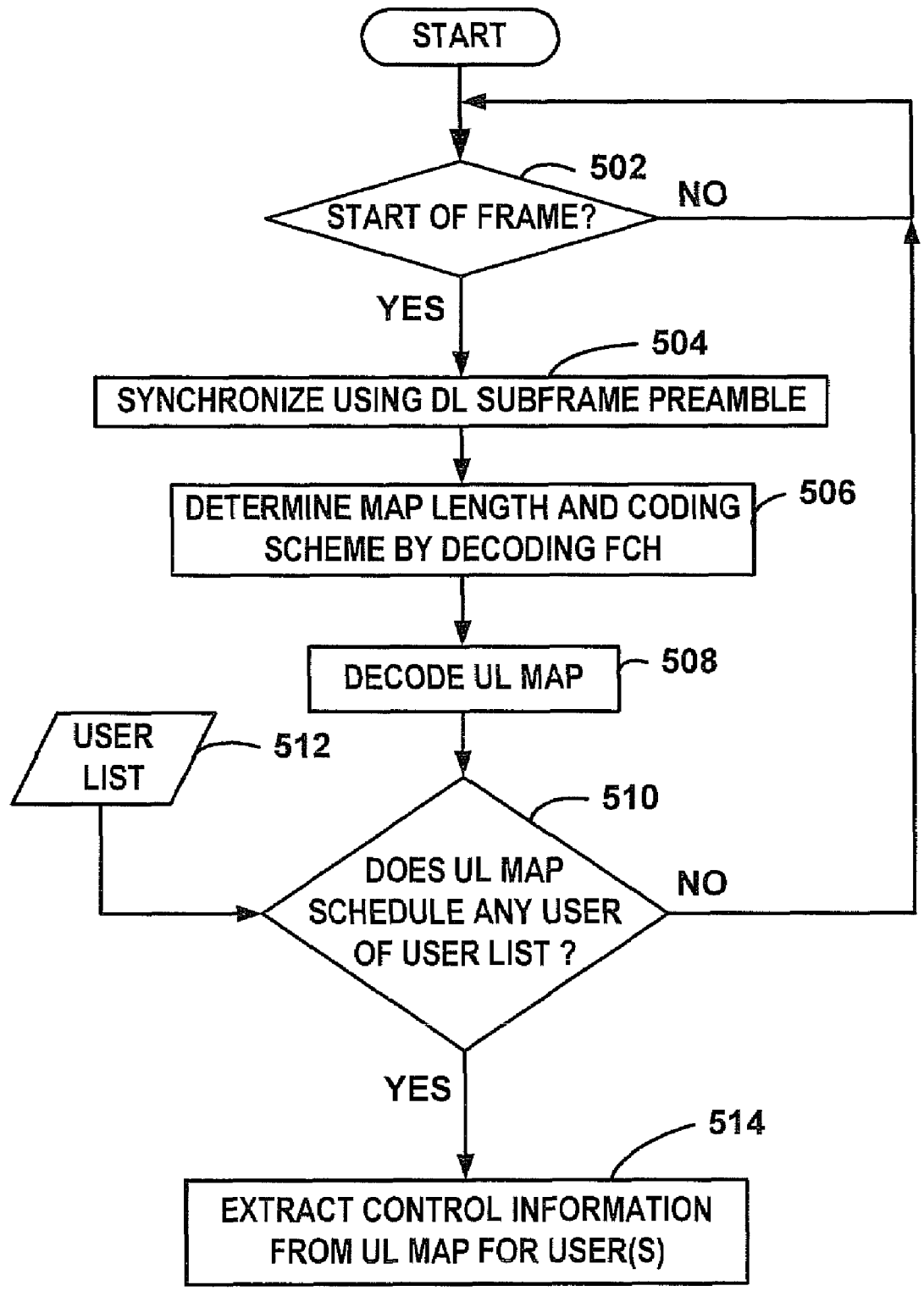
FIG. 5 is a flow chart of a method of monitoring a WWAN FL channel at a peripheral access point where the WWAN system operates in accordance with the IEEE 802.16 standard.

FIG. 5 is a flow chart of a method of monitoring a WWAN FL channel at DAP 112 where the WWAN system 104 operates in accordance with OFDM techniques. The exemplary method operates within an OFDMA system that functions in accordance with IEEE 802.16(e) protocols. The method described with reference to FIG. 5 is an example of suitable technique for acquiring information that allows the DAP 112 to monitor the reverse link WWAN channels. As explained above, some scheduling and identification information may be obtained by the DAP 112 through the WLAN controller 106. As discussed with reference to FIG. 5 and FIG. 6, the forward link (FL) WWAN signal and WWAN FL channels are referred to as downlink (DL) signals and downlink (DL) channels and correspond to communications from an OFDMA base station, sometimes referred to as an access node (AN), to the communication device 110. As discussed with reference to FIG. 5 and FIG. 6, reverse link (RL) WWAN signals and WWAN RL channels are referred to as uplink (UL) signals and uplink (UL) channels and correspond to communications from the communication device 110 to the OFDMA base station. As is known, IEEE 802.16(e) standards (WiMax) can operate in a time division duplex (TDD) or frequency division duplex (FDD) scheme. In the exemplary embodiment, the system operates in TDD mode. Those skilled in the art will readily apply the teachings herein to implement the system in FDD mode. In a TDD mode, each frame is split into a downlink (DL) sub-frame and an uplink (UL) sub-frame. The DL sub-frame includes a preamble, control information and other broadcast messages and packets. The control information includes DL and UL MAPs. Each communication device 110 is assigned a specific set of frequencies for receiving respective data packets. Each communication device 110 is also assigned a set of frequencies for transmitting in the UL.

At step 502, the controller 204 locates the start of a DL frame. When the start of the frame is found, the method continues at step 504. Otherwise, the step 502 is repeated.

At step 504, the WWAN FL receiver 224 acquires and synchronizes to the incoming signal using the DL sub-frame preamble. The WWAN FL receiver 224, therefore, performs the functions of a DL receiver in the exemplary method.

At step 506, the Frame Control Header (FCH) is decoded to determine the DL data burst length and coding scheme. In the exemplary method, the FCH burst is followed by the preamble. In networks operating in accordance with IEEE 802.16 standards, an uplink map (UL MAP) is a Medium Access Control (MAC) message that defines burst start times and frequencies on the UL channels for each communication device 106.

At step 508, the UL MAP is decoded. Accordingly, the received DL signals provides information in the UL MAP that allows the controller 204 to determine the timing of UL signals and carrier frequencies assigned to the communication device 110. In addition, the UL MAP includes user identification (ID) information corresponding to communication devices that are receiving the DL signals from the base station (access node).

At step 510, it is determined whether one or more of the communication devices listed in a user list 512 at the access point 110 are contained in the UL MAP. The user list 512 includes identification information that uniquely identifies communication devices that are supported by the access point 112. For example, the IEEE 802.16(e) standard uses manufacturer-issued X.509 digital certificates to identify devices. In the exemplary embodiment, the user list is provided by the WLAN controller 106 and updated accordingly. The user list 512, however, may be programmed at the time of installation of the DAP 112 and may be modified to add or remove user IDs. If no user IDs in the user list are contained in the UL MAP, the method returns to step 502. Otherwise, the method continues at step 514. In some circumstances, the UL MAP may not contain an explicit identification number and may include indirect identification information that can be used to determine the identity of the communication device 110.

At step 514, the control information for all of identified users is extracted from the UL MAP or other control messages. The control information is the transmission RL control information that includes a RL transmission power level and a RL transmission time for the WWAN RL signals transmitted by the communication devices 110. The timing information corresponding to the identified communication device is extracted from the decoded UL MAP and stored in memory. The control and scheduling information is forwarded to the WLAN controller 106 as described above.

Figure 6:
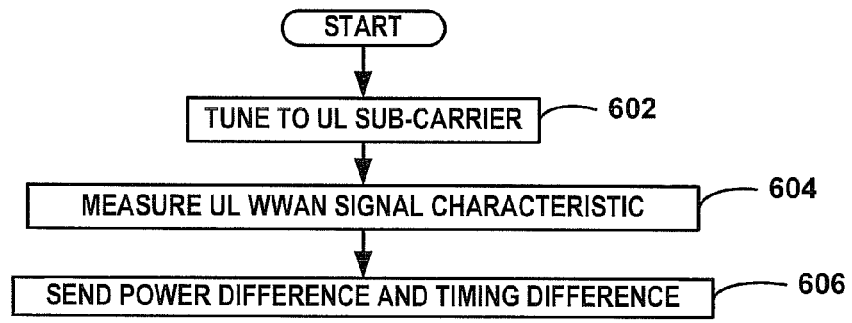
FIG. 6 is a flow chart of an exemplary monitoring a WWAN RL channel where the WWAN system operates in accordance with the IEEE 802.16 standard.

FIG. 6 is a flow chart of an exemplary method of managing wireless resources where the WWAN system 104 operates in accordance with OFDMA based system such as IEEE 802.16(e). The exemplary method is performed by the DAP 112 and includes monitoring a WWAN RL channel and sending reverse link information 116 to the WLAN controller 106 based on a received WWAN RL signal. As explained above, the WWAN RL signals and WWAN RL channels are referred to as UL signals and UL channels with reference to FIG. 6. Using the information determined with the method discussed with reference to FIG. 5, or the information received from the access gateway 230, the access point 112 monitors the UL WWAN channel and sends the reverse link information 116 to the WLAN controller 106 Accordingly, steps 602-604 provide an exemplary technique for performing steps 404, and 412 discussed with reference to FIG. 4 above.

At step 602, the WWAN receiver 220 is tuned to the UL sub-carrier frequency indicated by the UL map. The UL sub-carrier frequency received from the access gateway or extracted in step 514 is used to tune the WWAN RL receiver 220. In some situations, a single receiver may be tuned to both uplink and downlink frequencies. In the exemplary embodiment, WWAN interface 201 can simultaneously receive UL and DL signals.

At step 604, the characteristics of the received UL WWAN signal are measured. In the exemplary embodiment, the controller 204 determines the power level and the reception time of the received UL signal. In some situations only the reception time or the power level is determined. Using known techniques, the power of the received UL WWAN signal is measured and stored in memory 206. The reception time is determined relative to the system time and stored in memory.

Other signal characteristics may be determined in some circumstances where the signal characteristics provide information regarding the proximity of the communication device 110 to the DAP 112 or other DAP 122. In the exemplary embodiment, the identification information is used to identify the communication device 110 only and not to decode the signals in order to minimize cost. In some implementations, however, the identification information may be used to decode the WWAN RL signals.

Figure 7:
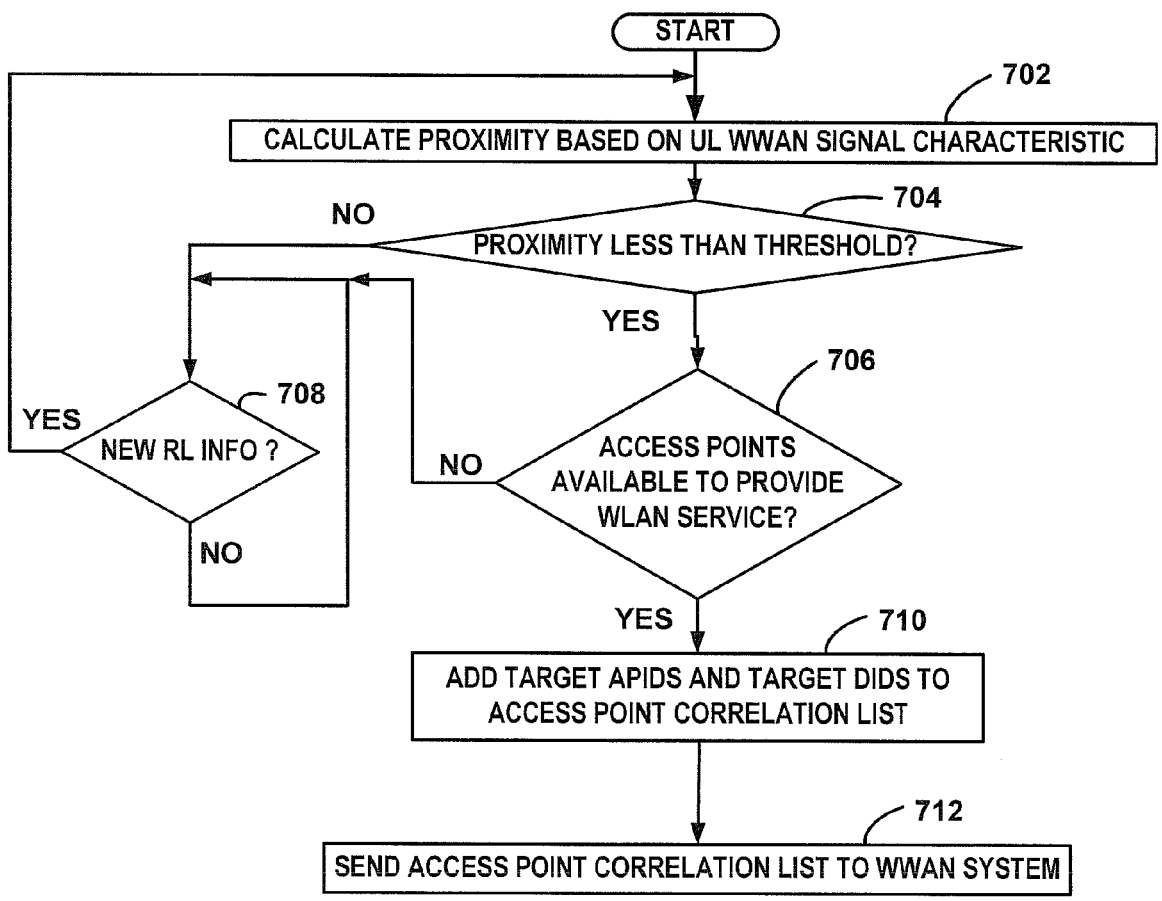
FIG. 7 is a flow chart of a method performed in a WLAN controller where the WWAN system operates in accordance with the IEEE 802.16 standard.

FIG. 7 is a flow chart of an exemplary method of managing wireless resources performed in a WLAN controller 106 where the WWAN system 104 operates in accordance with OFDMA based system such as IEEE 802.16(e) The exemplary method includes using the RL information received from the DAPs 112, 122, 124 to generate a device-AP association list 118.

At step 702, the WLAN controller 106 calculates the proximity of the communication devices 110, 126, 128, 130 based on the reverse link information 116, 146, 148 received from one or more DAPs 112, 122, 124. Based on the characteristics of the UL signal, the processor 232 determines the distance from each access point to each communication device. Using the transmission time of the WWAN UL signal determined from the UL MAP and reception time, the processor 232 calculates a propagation time of the signal. The propagation attenuation of the signals is determined by calculating the difference between the transmission power and the reception power. Using either or both of the propagation parameters, the processor 232 calculates the proximity of the communication devices to the access points. For example, the distance may be determined by multiplying the propagation time by the speed of light. The distance may also be calculated by comparing the propagation loss to a known propagation loss per distance function for the antennas. The distance values may be averaged or otherwise processed to determine the proximity. Further, the processor 232 may use reverse link information received from other access points to determine the proximity to the access point.

At step 704, it is determined whether the proximity of each communication device to the nearest DAP is less than a threshold. The threshold is therefore a maximum proximity and may be based on any of several factors. Further, the threshold may be dynamic in some cases. In the exemplary embodiment, the threshold is the maximum distance between a communication device and a DAP where the DAP can provide WLAN service to the communication device. If the proximity is less than the threshold, the method continues at step 706. Otherwise, the method continues to step 710 where the procedure includes returning to step 702 when new RL information is received.

At step 706, it is determined whether each DAP is available to provide WLAN services to one or more communication devices. Although the determination may be based solely on the proximity of the communication device to a DAP, other factors may be considered in some circumstances. Examples of other factors include the capacity of the DAP, the capacity of the mesh network communication system 102, the required bandwidth required by the communication device 110, the current cost of the WWAN service, and the estimated motion of the communication device 110. If the WLAN controller determines that the DAP is available, the DAP is considered a target access point. The appropriate access point identifier (APID) is added to the device-AP association list with the corresponding device identifiers (DIDs) at step 710. If no access points are available to provide WLAN service, the method continues at step 708, otherwise, the method proceeds to step 710.

At step 710, each access point identifier corresponding to a target access point is added to the list 118 and associated with the device identifiers corresponding to the target communication devices. Any of numerous techniques may be used to generate the list 118 as discussed above.

At step 714, the device-AP association list 118 is sent to the WWAN service provider. The message includes information that, when interpreted by the WWAN system 104, allows the WWAN system 104 to efficiently instruct target communication devices to perform handoffs or search for WLAN service. The instructions from the WWAN system 104 to the communication device 110 may result in the search for a target DAP. In some circumstances the acquisition may result in a handoff from the WWAN system to the WLAN system. In other circumstances, service may be maintained from the WWAN system 104 or the communication device may remain registered on the WWAN system 104 although no user data is transmitted over the WWAN communication channels.

Therefore, WWAN and WLAN services to multi-mode wireless communication devices are efficiently managed by providing the WWAN system with a device-AP association list. The WWAN system can determine which if any of the target communication devices should acquire WLAN service. Further, the WWAN system can efficiently determine which target access points should provide WLAN service to particular target communication devices.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A mesh network communication system for providing wireless local area network (WLAN) service within a mesh network service area, the mesh network communication system comprising:
    a plurality of access points configured to provide WLAN service within the mesh network communication system, the plurality of access points comprising a plurality of detection access points (DAPS) configured to receive reverse link (RL) wireless wide area network (WWAN) signals transmitted by multi-mode wireless communication devices; and
    a WLAN controller connected to the plurality of access points through a backhaul and configured to:
        generate a device to access point association list (device-AP association list), based on the RL WWAN signals, comprising a plurality of target access point identifiers and a plurality of device identifiers, each target access point identifier associated with at least one device identifier, each device identifier uniquely identifying, based on the RL WWAN signals, a target multi-mode wireless communication device within a maximum proximity of a target access point identified by one of the plurality of target access point identifiers, and
        send the device-AP association list to a wireless wide area network (WWAN).

2. The system of claim 1, the WLAN controller comprising:

an access point interface configured to receive reverse link information from the plurality of DAPs, the reverse link information based on the RL WWAN signals; and a processor configured to identify the target multi-mode wireless communication device from the multi-mode communication devices based on the reverse link information.

3. The system of claim 2, wherein the processor is further configured to estimate the proximity of the target multi-mode wireless communication device to the target access point based on the reverse link information and to determine the target multi-mode wireless communication device is within a target access point service area based on the proximity.

4. The system of claim 3, wherein the processor is further configured to estimate the proximity based on a received power level of one or more RL WWAN signals received at one or more DAPs.

5. The system of claim 4, wherein at least one of the DAPs further comprises a forward link WWAN receiver configured to receive a forward link WWAN signal comprising control data for the target multi-mode wireless communication device, the processor further configured to generate the device-AP association list based, at least partially, on the control data and the received power level of the one or more WWAN signals.

6. The system of claim 3, wherein the processor is further configured to generate the device-AP association list indicating the association of the device identifier to the target access point identifier based on the determination that the target multi-mode wireless communication device is within the target access point service area.

7. The system of claim 1, wherein the target access point is a DAP.

8. The system of claim 1, wherein at least one of the target access point identifiers is associated with two or more device identifiers.

9. The system of claim 1, wherein each of the DAPs comprises a WWAN reverse link receiver.

10. The system of claim 1, wherein the WLAN controller is an access point.

11. A wireless local area network (WLAN) controller configured to communicate with a plurality of access points to form a mesh network providing WLAN service within a mesh network service area, the WLAN controller comprising:

an access point interface configured to receive reverse link information related to reverse link (RL) wireless wide area network (WWAN) signals transmitted by multi-mode wireless communication devices and received at one or more detection access points (DAPs) providing WLAN service within DAP service areas;

a processor configured to generate a device to access point association list (device-AP association list), based on the RL WWAN signals, comprising a plurality of target access point identifiers and a plurality of device identifiers, each target access point identifier associated with at least one device identifier, each device identifier uniquely identifying, based on the RL WWAN signals, a target multi-mode wireless communication device within a maximum proximity of a target access point identified by one of the plurality of target access point identifiers; and a WWAN interface configured to send the device-AP association list to a wireless wide area network (WWAN).

12. The WLAN controller of claim 11, further comprising:

a processor configured to identify the target multi-mode wireless communication device based on the reverse link information.

13. The WLAN controller of claim 12, wherein the processor is further configured to estimate the proximity of the target multi-mode wireless communication device to the target access point based on the reverse link information and to determine the target multi-mode wireless communication device is within a target access point service area based on the proximity.

14. The WLAN controller of claim 13, wherein the processor is further configured to estimate the proximity based on a received power level of one or more WWAN signals received at one or more DAPs.

15. The WLAN controller of claim 14, wherein the processor is further configured to generate the device-AP association list at least partially based on reverse link control data and the received power level.

16. The WLAN controller of claim 15, wherein the reverse link control data is received at a DAP having a forward link (FL) WWAN receiver.

17. The WLAN controller of claim 14, wherein the processor is further configured to generate the device-AP association list indicating the association of the device identifier to the target access point identifier based on the determination that the target multi-mode wireless communication device is within the target access point service area.

18. The WLAN controller of claim 11, wherein at least one of the target access point identifiers is associated with two or more device identifiers.

19. The WLAN controller of claim 11, wherein the WLAN controller is an access point.

* * * * *